United States Patent
Mosgrove et al.

(10) Patent No.: US 11,653,140 B2
(45) Date of Patent: May 16, 2023

(54) MODULAR ACOUSTIC SYSTEMS

(71) Applicant: Bose Corporation, Framingham, MA (US)

(72) Inventors: Colin Taylor Mosgrove, Needham, MA (US); Nathan David Schaal, Cambridge, MA (US)

(73) Assignee: Bose Corporation, Framingham, MA (US)

( * ) Notice: Subject to any disclaimer, the term of this patent is extended or adjusted under 35 U.S.C. 154(b) by 250 days.

(21) Appl. No.: 17/100,315

(22) Filed: Nov. 20, 2020

(65) Prior Publication Data
US 2022/0167077 A1    May 26, 2022

(51) Int. Cl.
*H04R 1/10*    (2006.01)
(52) U.S. Cl.
CPC ......... *H04R 1/1066* (2013.01); *H04R 1/1008* (2013.01); *H04R 1/1075* (2013.01)
(58) Field of Classification Search
CPC .. H04R 1/1066; H04R 1/1008; H04R 1/1075; H04R 1/105; H04R 1/028; G02C 11/06; G02C 11/10; G02C 11/00; G02C 2200/02
See application file for complete search history.

(56) References Cited

U.S. PATENT DOCUMENTS

| | | | |
|---|---|---|---|
| 2007/0201000 A1* | 8/2007 | Jackson | G02C 11/10 351/158 |
| 2017/0219831 A1* | 8/2017 | Haddick | H04R 1/1016 |
| 2019/0239007 A1* | 8/2019 | Kennes | H04R 25/606 |
| 2019/0266247 A1* | 8/2019 | Osterhout | G06F 40/58 |
| 2020/0064654 A1* | 2/2020 | De La Fuente | G02C 11/10 |

FOREIGN PATENT DOCUMENTS

| | | | |
|---|---|---|---|
| CN | 209343065 U | * | 9/2019 |
| CN | 209343065 U | | 9/2019 |
| WO | 2015106500 A1 | | 7/2015 |
| WO | 2019031624 A1 | | 2/2019 |
| WO | WO-2019031624 A1 | * | 2/2019 |

OTHER PUBLICATIONS

International Search Report and Written Opinion dated Apr. 21, 2022 for International application No. PCT/US2021/059976.

* cited by examiner

*Primary Examiner* — Oyesola C Ojo

(57) ABSTRACT

A modular audio system which includes an acoustic module configured to be removably engaged with a head-worn peripheral device. In some examples, the head-worn peripheral device is a pair of eyeglass frames and the acoustic module is configured to removably secure to a socket arranged on the inside face of the temples of the eyeglasses. The acoustic module may be configured to magnetically engage with the peripheral device such that, in a resting, coupled position, respective components of magnetic retention force are provided in at least two axial directions that are orthogonal to each other; i.e., a first component of magnetic retention force is provided in a first (horizontal) axial direction and a second component of magnetic retention force is provided in a second (vertical) axial direction.

17 Claims, 14 Drawing Sheets

MODULAR ACOUSTIC SYSTEMS

BACKGROUND

Aspects and implementations of the present disclosure are generally directed to modular audio systems, for example, audio systems which include a removable acoustic module. FIG. 1A illustrates an earlier design of a modular audio system 10 including an acoustic module 12 configured to be removably engaged with a head-worn peripheral device 14. In the earlier design, a pair of magnets 16 (FIG. 1B) were provided along a vertical outer surface of the acoustic module 12. These magnets 16 were arranged to couple with complementary magnets 18 arranged along a vertical inner surface of a temple portion (temple 20) of a pair of eyeglasses 22. This prior design also included protrusions 24 that extended outwardly from the vertical inner surface of the temple 20, which engaged recesses 26 (FIG. 1B) in the vertical outer surface of the acoustic module 12 to assist with alignment.

This design suffered from a couple of issues. The magnetic retention forces acted predominantly in a horizontal plane, and, as a result, offered very little resistance to decoupling forces in the vertical direction. In addition, the bottom edge of the acoustic module 12 sat below the bottom edge of the temple 20, and, as a result, was prone to contact when the user adjusted the eyeglasses 22. Even a modest amount of force on the exposed edge of the acoustic module 12 would result in decoupling. This design was also prone to decoupling when dropped. And, the interaction between the protrusions 24 and the recesses 26 did little to assist with retention, particularly in the horizontal direction.

SUMMARY OF THE DISCLOSURE

The present disclosure relates modular audio systems which include an acoustic module configured to be removably engaged with a head-worn peripheral device. In some examples, the head-worn peripheral device is a pair of eyeglass frames and the acoustic module is configured to removably secure to a socket arranged on the inside face of the temples of the eyeglasses. The acoustic module can releasably engage with the socket such that, when secured, the acoustic module is configured to generate acoustic energy in the form of audible sound proximate a user's ear while the user is wearing the head-worn peripheral device. In some examples, the acoustic module is configured to removably secure to any portion of the head-worn peripheral device, e.g., on the temples of the eyeglass frames. In some examples, the acoustic module is configured to magnetically engage with the peripheral device such that, in a resting, coupled position, respective components of magnetic retention force are provided in at least two axial directions that are orthogonal to each other; i.e., a first component of magnetic retention force is provided in a first (horizontal) axial direction and a second component of magnetic retention force is provided in a second (vertical) axial direction.

In one aspect, a removable acoustic module includes an acoustic module housing that is configured to removably engage with a head-worn peripheral device such that, when engaged with the head-worn peripheral device, the removable acoustic module is arranged to provide acoustic energy proximate a user's ear. First circuitry is arranged within the acoustic module housing. The first circuitry includes acoustic circuitry and an acoustic transducer. The acoustic circuitry is arranged to produce a first electrical signal. The first electrical signal is utilized by the acoustic transducer to produce the acoustic energy proximate the user's ear. The acoustic module housing is arranged to magnetically couple to the head-worn peripheral device such that a component of magnetic retention force is provided in a vertical axial direction relative to ground.

Implementations may include one of the following features, or any combination thereof.

In some implementations, the acoustic module housing is arranged to magnetically couple to the head-worn peripheral device such that, in a resting, coupled position, respective components of magnetic retention force are provided in at least two axial directions that are orthogonal to each other.

In certain implementations, the acoustic module housing includes a top side, a bottom side, a first side surface, a second side surface, a first end, a second end, and a tapered surface that extends between the top side and the first side surface, and a magnetic element arranged on, in, or beneath the tapered surface to magnetically couple to the head-worn peripheral device.

In some cases, the magnetic element includes a permanent magnet or a material with high magnetic permeability for magnetically coupling to the head-worn peripheral device.

In certain cases, the acoustic module housing also includes a recess or a protrusion that is arranged to engage the other of a recess or a protrusion of the head-worn peripheral device when the acoustic module is coupled to the head-worn peripheral device.

In some examples, the acoustic module housing includes a pair of hook-shaped recesses that are configured to engage a corresponding pair of hook-shaped protrusions on the head-worn peripheral device.

In certain examples, the acoustic module housing includes a top side, a bottom side, a first side surface, a second side surface, a first end, a second end, and a tapered surface that extends at least partially around a periphery of the first side surface such that the tapered surface is disposed between the first side surface and each of the top side, the first end, and the second end. The recesses are arranged on the tapered surface in regions between the first side surface and upper portions of the first end and the second end, respectively, of the acoustic module housing.

In some implementations, the removeable acoustic module also includes a magnetic element arranged on, in, or beneath the tapered surface to magnetically couple to the head-worn peripheral device.

In certain implementations, the magnetic element includes a permanent magnet or a material with high magnetic permeability for magnetically coupling to the head-worn peripheral device.

In some cases, the acoustic module housing includes a plurality of recesses that are arranged to engage a corresponding plurality of projections on the head-worn peripheral device so as to inhibit rotation of the acoustic module away from the head-worn peripheral device once the acoustic module has been coupled to the head-worn peripheral device.

In some examples, the removable acoustic module is part of a modular audio system that also includes the head-worn peripheral device. The head-worn peripheral device may have a wearable eyeglass form-factor that includes a temple. The temple includes a socket arranged to receive and removably engage with the removable acoustic module.

In certain examples, the acoustic module housing defines a first tapered surface that supports a first magnetic element and wherein the socket defines a second tapered surface that supports a second magnetic element configured to magnetically couple with the first magnetic element.

In some implementations, at least one of the first magnetic element and the second magnetic element includes a permanent magnet.

In certain implementations, at least one of the first magnetic element and the second magnetic element includes a plate formed of a material with high magnetic permeability.

In some cases, the acoustic module housing includes a pair of hook-shaped recesses, and the socket includes a corresponding pair of hook-shaped protrusions that are configured to engage the hook-shaped recesses.

In another aspect, a removable acoustic module includes an acoustic module housing that is configured to removably engage with a head-worn peripheral device such that, when engaged with the head-worn peripheral device, the removable acoustic module is arranged to provide acoustic energy proximate a user's ear. First circuitry is arranged within the acoustic module housing. The first circuitry includes acoustic circuitry and an acoustic transducer. The acoustic circuitry is arranged to produce a first electrical signal. The first electrical signal is utilized by the acoustic transducer to produce the acoustic energy proximate the user's ear. The acoustic module housing is arranged to magnetically couple to the head-worn peripheral device such that, in a resting, coupled position, respective components of magnetic retention force are provided in at least two axial directions that are orthogonal to each other.

Implementations may include one of the above and/or below features, or any combination thereof.

In some implementations, a first component of magnetic retention force is provided in a first, horizontal axial direction and a second component of magnetic retention force is provided in a second, vertical axial direction.

In certain implementations, the acoustic module housing includes a pair of hook-shaped recesses that are configured to engage a corresponding pair of hook-shaped protrusions on the head-worn peripheral device.

In some cases, the acoustic module housing includes a top side, a bottom side, a first side surface, a second side surface, a first end, a second end, and a tapered surface that extends at least partially around a periphery of the first side surface such that the tapered surface is disposed between the first side surface and each of the top side, the first end, and the second end, and the recesses are arranged on the tapered surface in regions between the first side surface and upper portions of the first end and the second end, respectively, of the acoustic module housing.

In certain cases, the removable acoustic module also includes a magnetic element arranged on, in, or beneath the tapered surface to magnetically couple to the head-worn peripheral device.

In some examples, the magnetic element includes a permanent magnet or a material with high magnetic permeability for magnetically coupling to the head-worn peripheral device.

In certain examples, the acoustic module housing includes a plurality of recesses that are arranged to engage a corresponding plurality of projections on the head-worn peripheral device so as to inhibit rotation of the acoustic module away from the head-worn peripheral device once the acoustic module has been coupled to the head-worn peripheral device.

In some cases, the removable module is part of a modular audio system that also includes the head-worn peripheral device having a wearable eyeglass form-factor. The wearable eyeglass form-factor includes a temple. The temple includes a socket arranged to receive and removably engage with the removable acoustic module.

In some implementations, the acoustic module housing defines a first tapered surface that supports a first magnetic element and wherein the socket defines a second tapered surface that supports a second magnetic element configured to magnetically couple with the first magnetic element.

In certain implementations, at least one of the first magnetic element and the second magnetic element comprises a permanent magnet.

In some cases, at least one of the first magnetic element and the second magnetic element includes a plate formed of a material with high magnetic permeability.

In certain cases, the acoustic module housing includes a plurality of recesses, and wherein the socket includes a corresponding plurality of protrusions that are configured to engage the plurality of recesses.

Another aspect features a removable acoustic module that includes an acoustic module housing that is configured to removably engage with a head-worn peripheral device such that, when engaged with the head-worn peripheral device, the removable acoustic module is arranged to provide acoustic energy proximate a user's ear. First circuitry is arranged within the acoustic module housing, the first circuitry comprising acoustic circuitry and an acoustic transducer, the acoustic circuitry arranged to produce a first electrical signal, the first electrical signal utilized by the acoustic transducer to produce the acoustic energy proximate the user's ear. The acoustic module housing includes a plurality of recesses that are arranged to engage a corresponding plurality of projections on the head-worn peripheral device so as to inhibit rotation of the acoustic module away from the head-worn peripheral device once the acoustic module has been engaged with the head-worn peripheral device.

Implementations may include one of the above and/or below features, or any combination thereof.

In some implementations, the acoustic module housing is arranged to magnetically couple to the head-worn peripheral device.

In certain implementations, the removable acoustic module is part of a modular audio system that also includes the head-worn peripheral device. The head-worn peripheral device has a wearable eyeglass form-factor that includes a temple. The temple includes a socket arranged to receive and removably engage with the removable acoustic module.

In some cases, the acoustic module housing defines a first tapered surface that supports a first magnetic element and wherein the socket defines a second tapered surface that supports a second magnetic element configured to magnetically couple with the first magnetic element.

In certain cases, at least one of the first magnetic element and the second magnetic element includes a permanent magnet.

In some examples, at least one of the first magnetic element and the second magnetic element includes a plate formed of a material with high magnetic permeability.

These and other aspects of the various embodiments will be apparent from and elucidated with reference to the embodiment(s) described hereinafter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the various embodiments.

DETAILED DESCRIPTION OF EMBODIMENTS

The present disclosure relates to modular audio systems which include an acoustic module configured to be removably engaged with a head-worn peripheral device. In some examples, the head-worn peripheral device is a pair of eyeglass frames and the acoustic module is configured to removably secure to a socket arranged on the inside face of the temples of the eyeglasses. The acoustic module can magnetically engage with the socket such that, when secured, the acoustic module is configured to generate acoustic energy in the form of audible sound proximate a user's ear while the user is wearing the head-worn peripheral device. In some examples, the acoustic module is configured to removably secure to any portion of the head-worn peripheral device, e.g., on the temples of the eyeglass frames. In some examples, the acoustic module is configured to magnetically engage with the peripheral device such that, in a resting, coupled (stable) position, respective components of magnetic retention force are provided in at least two axial directions that are orthogonal to each other; i.e., a first component of magnetic retention force is provided in a first (horizontal) axial direction and a second component of magnetic retention force is provided in a second (vertical) axial direction.

Figure 1A:
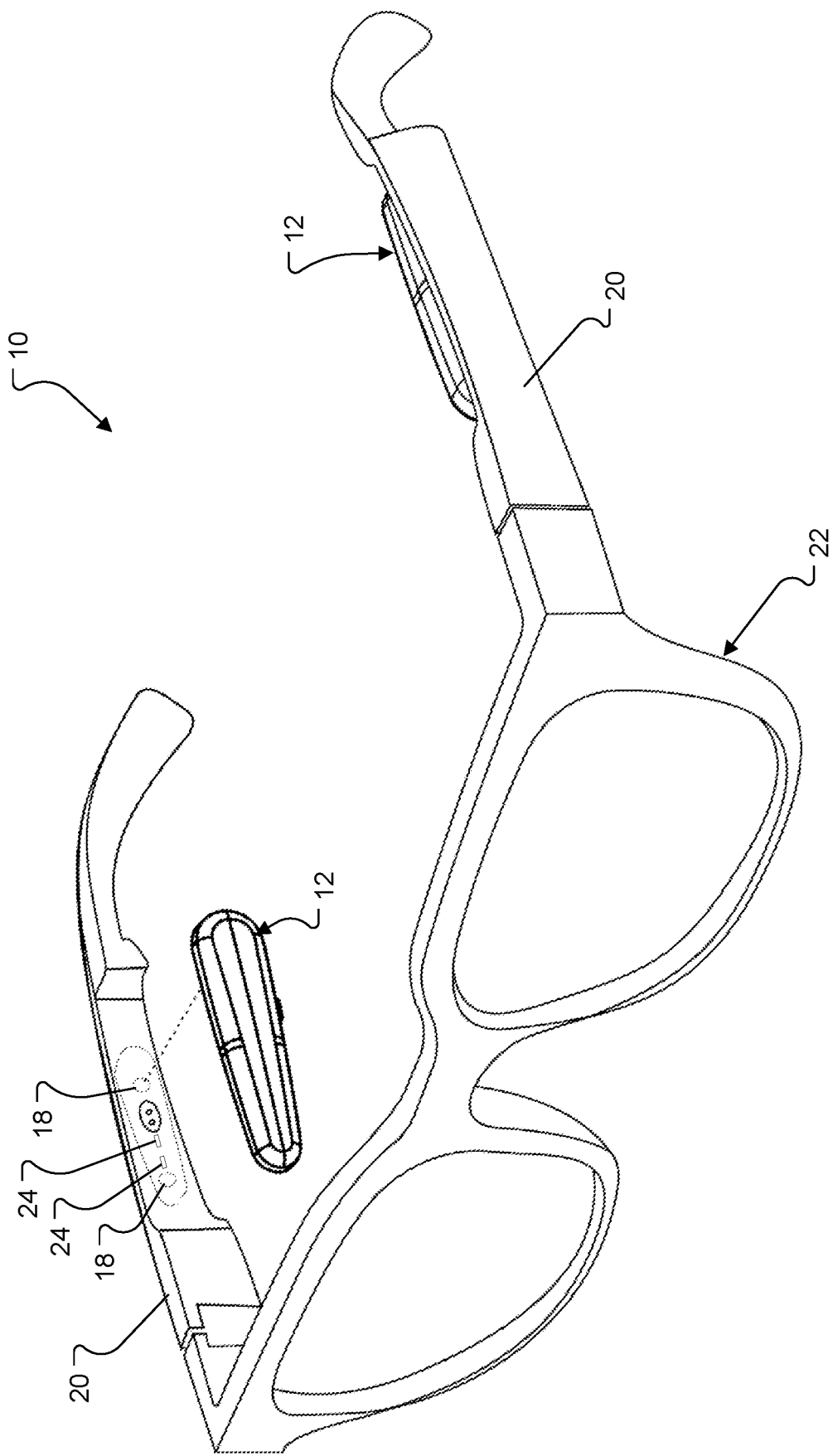
FIG. 1A is a schematic perspective view of a modular audio system according to an earlier design.
Figure 1B:
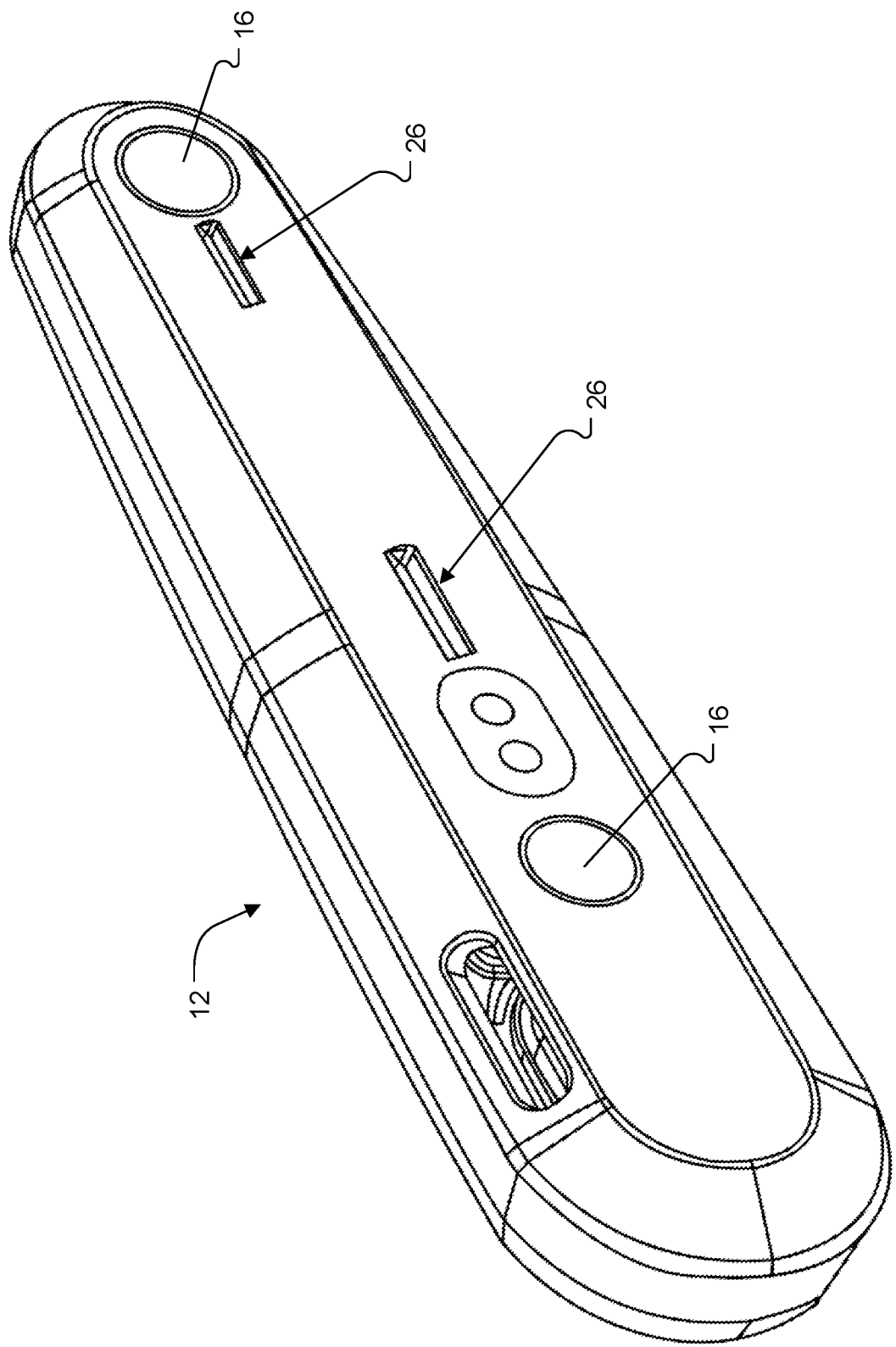
FIG. 1B is a right-side perspective view of an acoustic module from the system of FIG. 1A.
Figure 2:
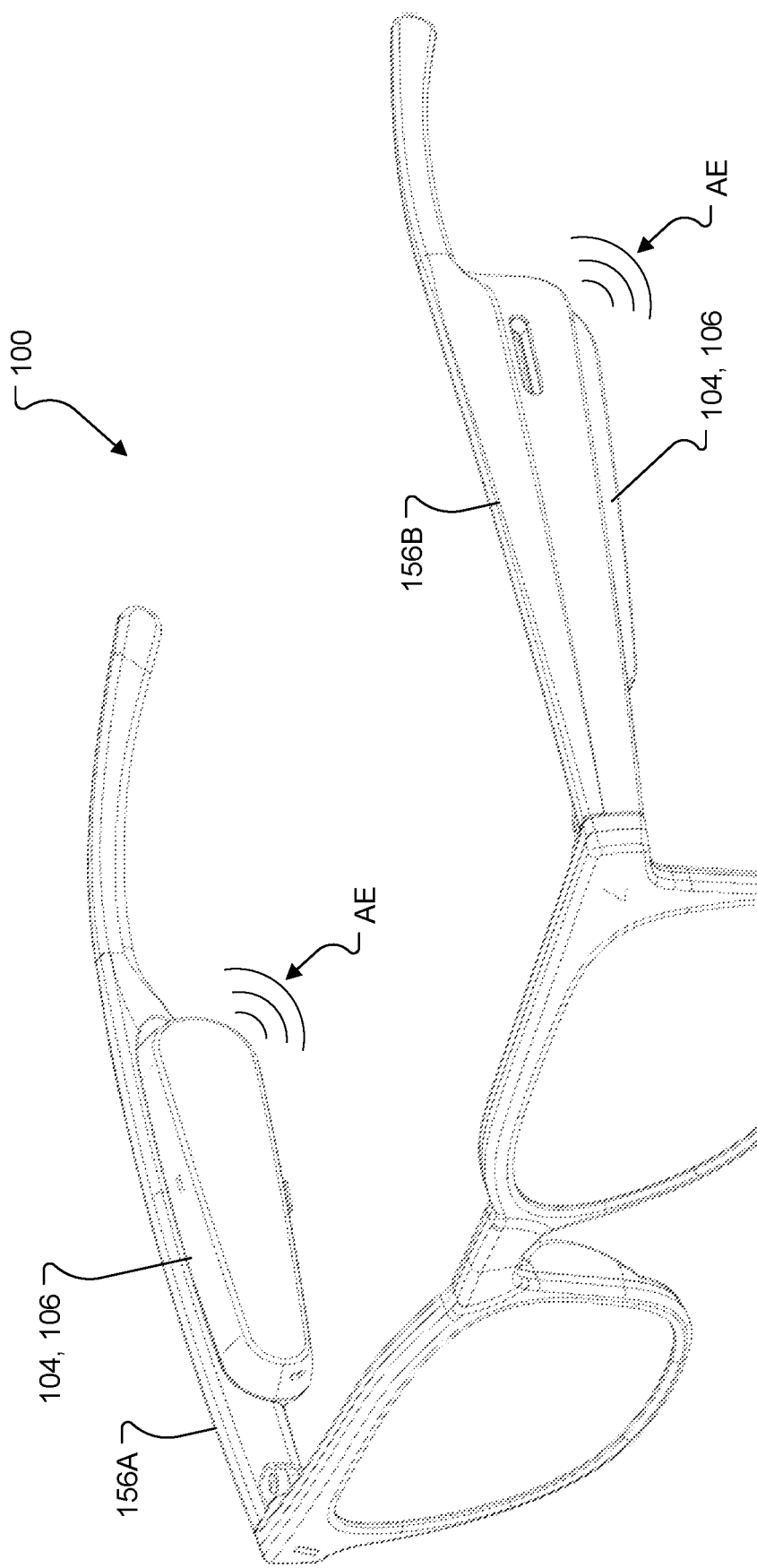
FIG. 2 is a schematic perspective view of a modular audio system according to the present disclosure.

The term "wearable audio device", as used in this application, is intended to mean a device that fits around, on, in, or near an ear (including open-ear audio devices worn on the head or shoulders of a user) and that radiates acoustic energy into or towards the ear. Wearable audio devices are sometimes referred to as headphones, earphones, earpieces, headsets, earbuds or sport headphones, and can be wired or wireless. A wearable audio device includes acoustic circuitry to transduce audio signals to acoustic energy. The acoustic circuitry may be housed in an earcup. While some of the figures and descriptions following may show a single wearable audio device, having a pair of earcups (each including an acoustic transducer) it should be appreciated that a wearable audio device may be a single stand-alone unit having only one earcup. Each earcup of the wearable audio device may be connected mechanically to another earcup or headphone, for example by a headband and/or by leads that conduct audio signals to an acoustic transducer in the ear cup or headphone. A wearable audio device may include components for wirelessly receiving audio signals. A wearable audio device may include components of an active noise reduction (ANR) system. Wearable audio devices may also include other functionality such as a microphone so that they can function as a headset. While FIG. 2 shows an example of an audio eyeglasses form factor, in other examples the headset may be an in-ear, on-ear, around-ear, or near-ear headset. In some examples, a wearable audio device may be an open-ear device that includes an acoustic transducer to radiate acoustic energy towards the ear while leaving the ear open to its environment and surroundings.

Figure 7A:
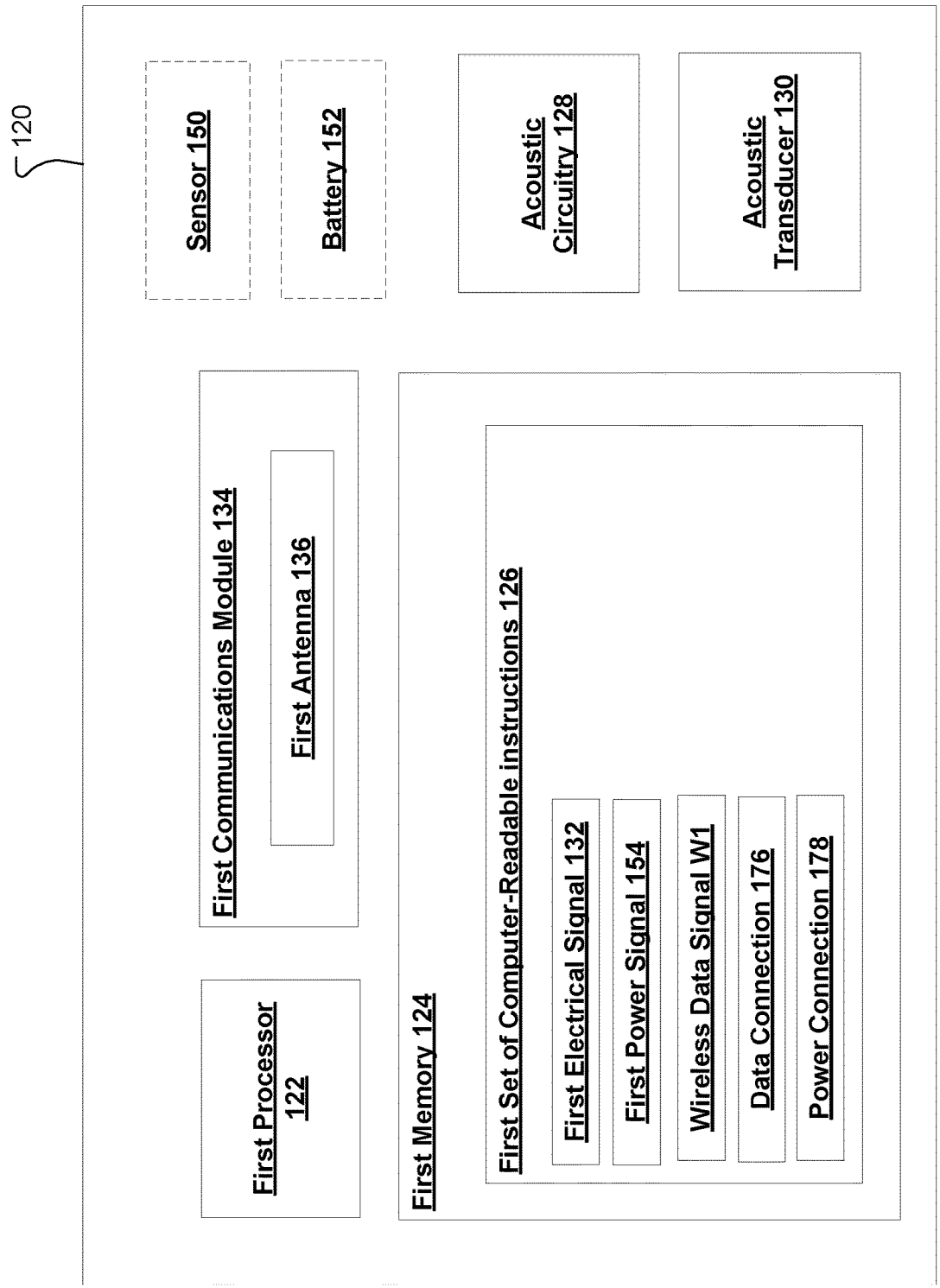
FIG. 7A is a schematic view of the internal components of an acoustic module according to the present disclosure.
Figure 7B:
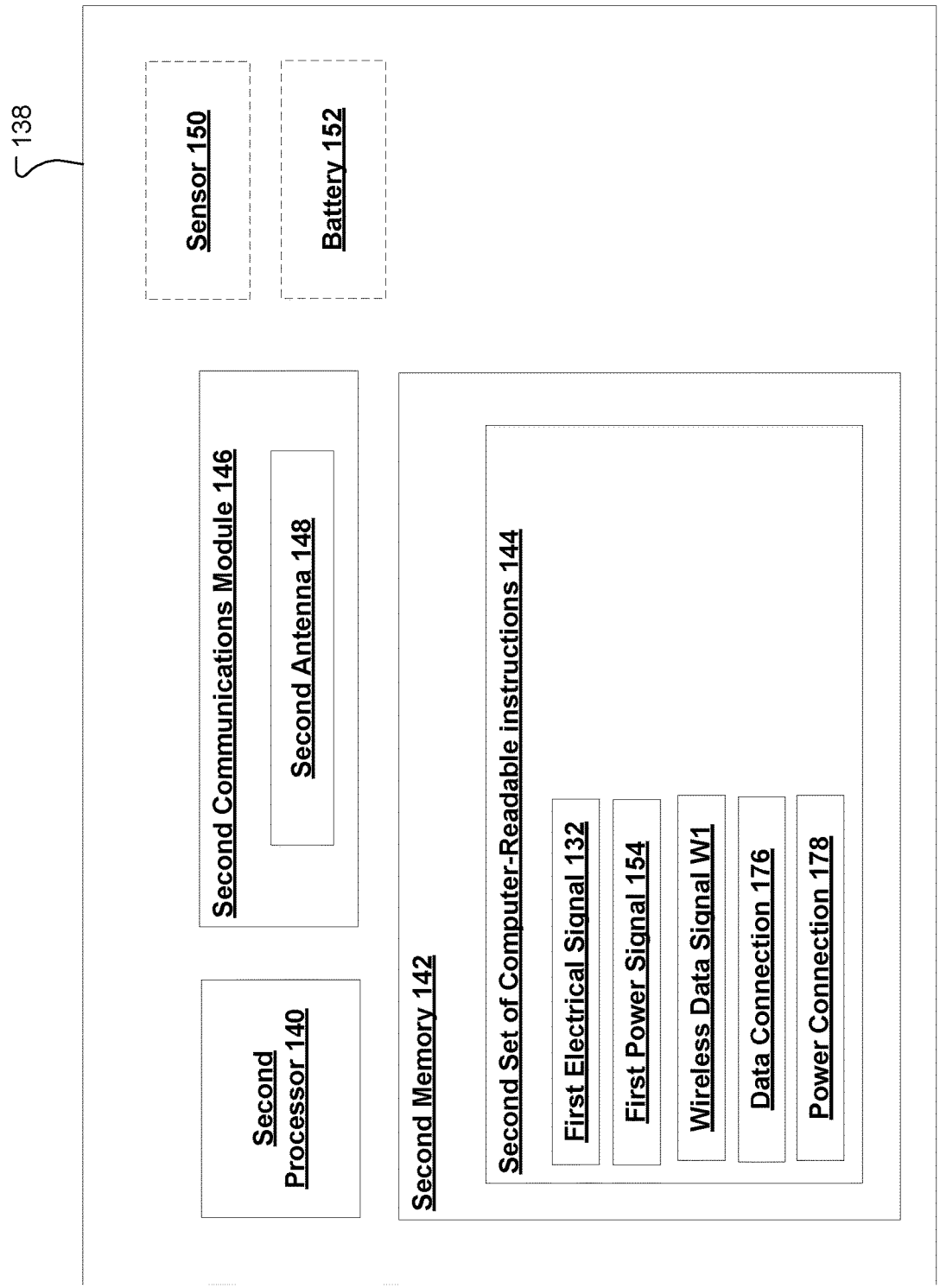
FIG. 7B is a schematic view of the internal components of a head-worn peripheral device according to the present disclosure.
Figure 8:
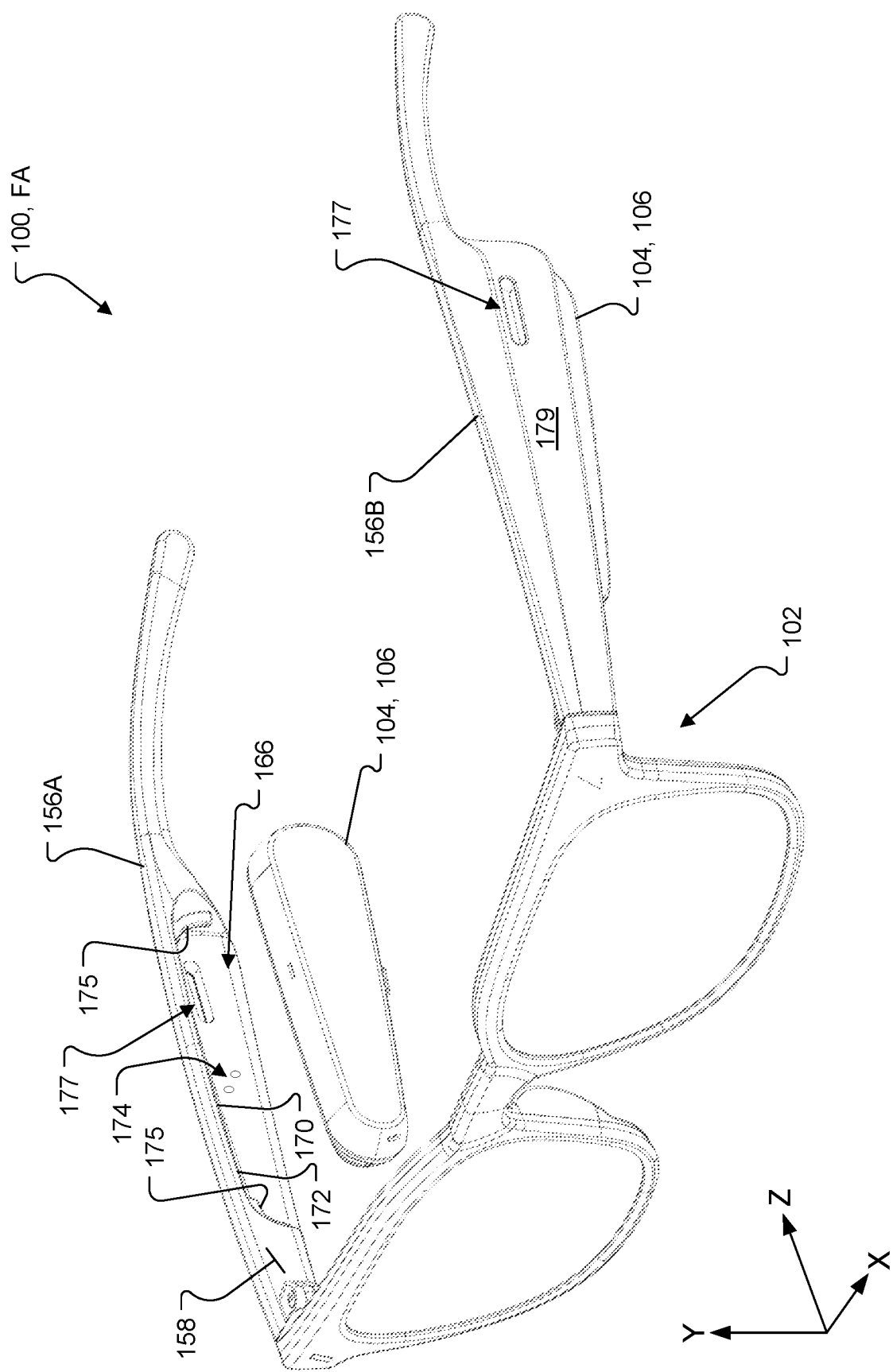
FIG. 8 is a schematic, partially exploded, perspective view of a modular audio system according to the present disclosure.

The following description should be read in view of FIGS. 2-8. FIG. 2 is a schematic view of modular audio system 100 according to the present disclosure. Modular audio system 100 includes a head-worn peripheral device 102 and at least one removable acoustic module 104. Head-worn peripheral device 102 is intended to be a device configured to attach to or contact a user's head and contact or engage with acoustic module 104 (discussed below). In one example, the head-worn peripheral device 102 is a pair of eyeglasses, i.e., an eyeglass form factor, configured to receive at least one acoustic module 104. In other examples, head-worn peripheral device 104 is a pair of safety glasses, a hat, a headband, a hood, a helmet, a visor, a pair of goggles, e.g., ski goggles, an open audio device worn on the head, shoulders, or neck, or any other device worn on or in proximity to a user's head or neck. Although some examples illustrated in the figures that follow only show one side or one perspective view of half of a head-worn peripheral device 102, it should be appreciated that the other sides of each example illustrated can include similar structure as well as a second acoustic module 104 (e.g., as shown in FIGS. 2 and 8) so that the acoustic energy AE produced by each acoustic module 104 can be provided to both a user's left ear and the user's right ear. Head-worn peripheral device 102 will be described in more detail below with respect to FIG. 8. Acoustic module 104 is intended to be a device configured to generate or render acoustic energy AE (shown in FIG. 2), i.e., audible sound, proximate a user's ear. In some examples, as illustrated in FIGS. 2 and 8, acoustic module 104 is configured to generate acoustic energy AE proximate to user's ear, but not configured to contact user's ear while generating the acoustic energy AE. In other words, acoustic module 104 is an open-ear acoustic module, configured to generate acoustic energy AE outside of the user's ear canal and direct acoustic energy AE toward the user's ear canal.

Figure 3:
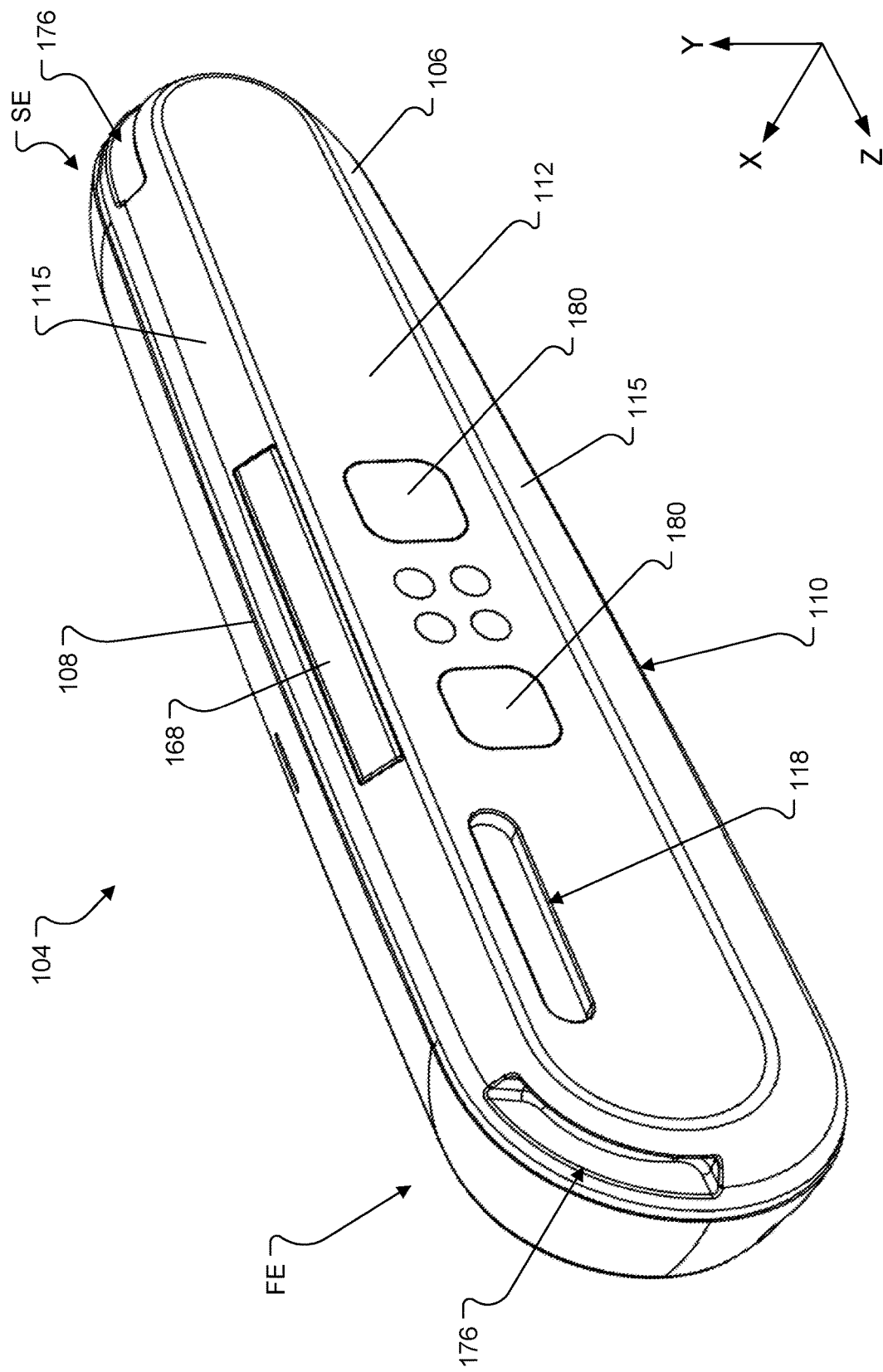
FIG. 3 is right-side perspective view of an acoustic module according to the present disclosure.
Figure 4:
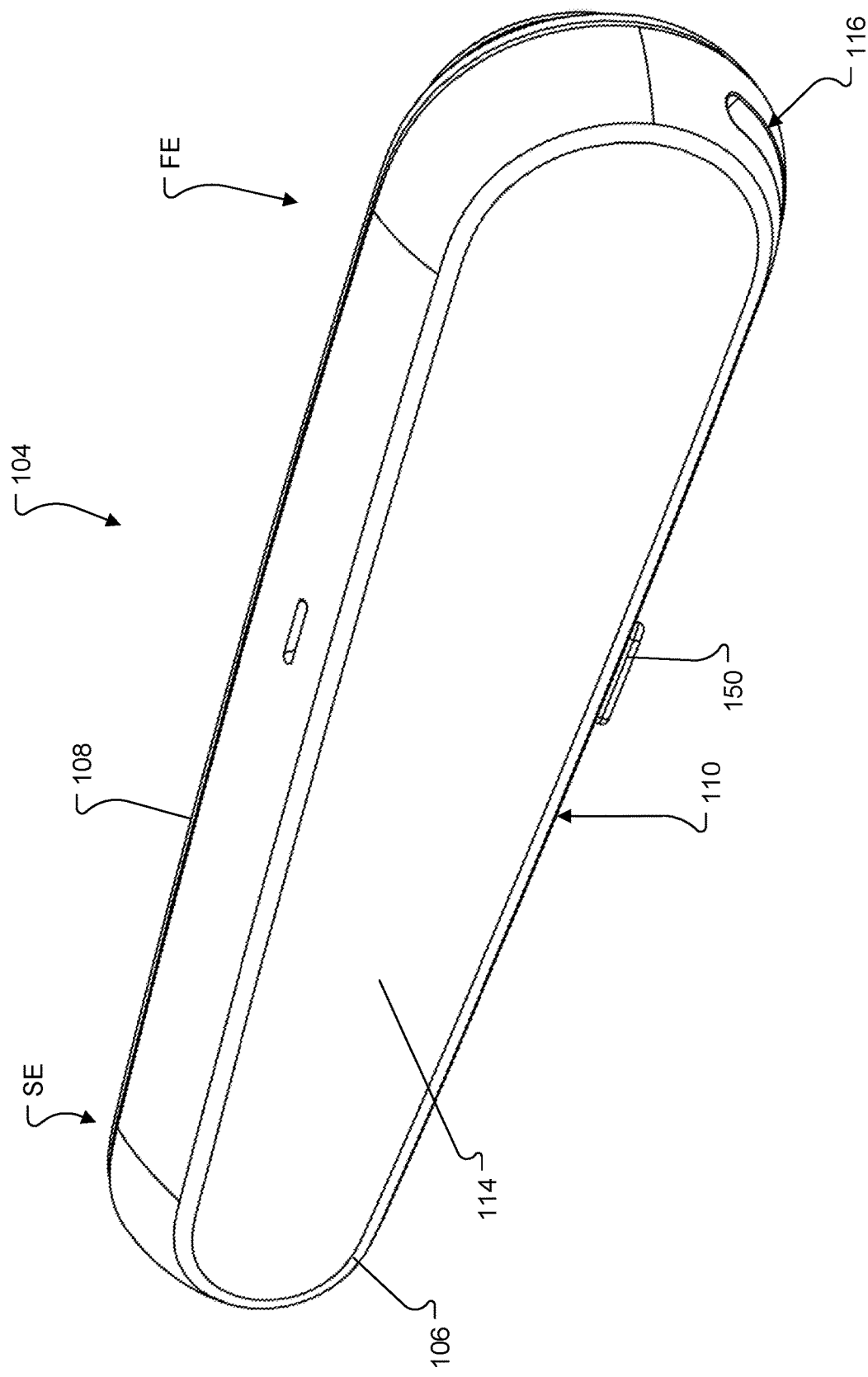
FIG. 4 is left-side perspective view of an acoustic module according to the present disclosure.

As illustrated in FIGS. 3-6B, acoustic module 104 includes an acoustic module housing 106. Acoustic module housing 106 is configured to at least partially encompass or surround the internal circuitry utilized to operate acoustic module 104, e.g., first circuitry 120 (discussed below). It should be appreciated that acoustic module housing 106 can be made from plastic materials, e.g., Polyethylene Terephthalate (PET), High-Density Polyethylene (HDPE), Low-Density Polyethylene (LDPE), Polyvinyl Chloride (PVC), Polypropylene (PP), Polystyrene (PS) or any other formable polymer. Additionally, in some examples, acoustic module housing 106 is made from metal, e.g., steel, aluminum, or other ferrous metals. In some embodiments, as will be discussed below, acoustic module housing 106 may be removably secured to head-worn peripheral device via magnetic attraction. In those examples it should be appreciated that some or all of the acoustic module housing can be made from a ferrous metal to shield the internal electronic components (discussed below) from interferences with the magnetic fields created. Acoustic module housing 106 includes a top side 108, a bottom side 110, a first (outer) side surface 112, and a second (inner) side surface 114. Additionally, as illustrated in FIGS. 3-6B, acoustic module housing 106 also includes first end FE and second end SE. Notably, a tapered surface 115 extends between the top side 108 and the first (outer) side surface 112. As shown in FIG. 3, the tapered surface 115 may extend around a periphery of the first side surface 112, such that the tapered surface 115 is disposed between the first side surface 112 and each of the top side 108, the bottom side 110, the first end FE and the second end SE.

In one example, acoustic module housing 106 includes two acoustic ports, i.e., first port 116 and second port 118, configured to allow acoustic energy AE to propagate out of the interior of acoustic module housing 106, into the air, and into the ear of the user. First port 116 may be acoustically coupled to a front side of an acoustic transducer internal to the housing, and second port 118 may be acoustically coupled to a rear side of the acoustic transducer. As shown in FIGS. 3-6B, first port 116 is located proximate first end FE of acoustic module housing 106 and is configured such that, when acoustic module 104 is engaged with or in contact with head-worn peripheral device 102, first port 116 is configured to direct acoustic energy AE directly to the ear of the user. In other words, first port 116 is configured to direct acoustic energy AE from first port 116 to the ear canal of the ear of the user where acoustic energy AE can propagate unimpeded to the ear canal of the user. Similarly, second port 118 is located proximate first end FE of acoustic module housing 106 and is further configured such that, when acoustic module 104 is engaged with or in contact with head-worn peripheral device 102, second port 118 is configured to direct acoustic energy AE away from the ear of the user. In one example, the size and positioning of each port, i.e., first port 116 and second port 118, can create two sources of acoustic energy AE outside of acoustic module housing 106. The two sources of acoustic energy AE, being in proximity to each other, creates an acoustic dipole to aid in the generation of acoustic energy AE that is perceived by the ears of the user. Although two ports are shown, there may be additional ports (i.e., more than one port acoustically coupled to the front side of an acoustic transducer and/or more than one port acoustically coupled to the rear side of the acoustic transducer). Proper acoustic tuning of the ports may be achieved through sizing of the ports and/or use of acoustic resistance material at the port openings. In addition, a screen may be used to prevent the ingress of particles such as dust or moisture into the ports.

As illustrated in FIG. 7A, first circuitry 120 is provided within acoustic module housing 106 of acoustic module 104. First circuitry 120 includes a first processor 122 and a first memory 124 arranged to execute and store, respectively, a first plurality of non-transitory computer-readable instructions 126 to perform the various functions of first circuitry 120 and acoustic module 104 as discussed herein. First circuitry 120 also includes acoustic circuitry 128 electrically connected to an acoustic transducer 130. Acoustic circuitry 128 is intended to be a circuit, a plurality of circuits, or a plurality of electrical components configured to receive electrical power from, e.g., a battery or other power source (discussed below), and convert the electrical power into an electrical signal, e.g., first electrical signal 132 (discussed below), or a series of discrete electrical signals, which are received by acoustic transducer 130 and converted into mechanical energy. Acoustic transducer 130 is intended to be a component or series of components, which converts an electrical signal, e.g., first electrical signal 132, into mechanical energy, such that the mechanical energy disturbs the surrounding air to create waves, e.g., sound waves. In one example, first memory 124 includes a plurality of music or audio files. Acoustic circuitry 128 can generate at least one electrical signal, i.e., first electrical signal 132, where first electrical signal 132, corresponds to at least a portion of one music or audio file of the plurality of music or audio files stored in first memory 124, and provide first electrical signal 132 to acoustic transducer 130. Acoustic transducer 130 then operates to generate discrete sound waves within acoustic housing 106 which are allowed to propagate outside acoustic module housing 106 via first port 116 and/or second port 118, potentially forming an acoustic dipole, such that the acoustic energy AE produced can propagate to the ear of the user.

First circuitry 120 can also include a first communications module 134 configured to send and/or receive data. First communications module 134 can also include first antenna 136 configured to send and/or receive a wireless signal W1, e.g., wireless data over a wireless protocol, where the wireless protocol is selected from at least one of: a Bluetooth protocol, a Bluetooth Low-Energy (BLE) protocol, a ZigBee protocol, a Wi-Fi (IEEE 802.11) protocol, iPod Accessory Protocol (iAP), Radio Frequency Communication (RF-COMM), Near-field Magnetic Induction (NFMI), Near-Field Electromagnetic Induction (NFEMI) or any other wireless protocol for establishing a wireless communication connection between acoustic module 104 and another wireless device, e.g., a personal computer (PC), smartphone, tablet, smart watch, and/or another acoustic module. In some examples, as will be described below, first communications module 134 may utilize first antenna 136 to establish a wireless data communication connection with head-worn peripheral device 102. It should also be appreciated that first antenna 136 can also send and/or receive wireless signals with additional peripheral devices, e.g., personal computers (PCs), smart phones, tablets, smart watches, another acoustic module etc.

First communications module 134 can also be configured to send and/or receive data via a wired connection. For example, first communications module 134 may include a data port configured to receive data via a cable or other physical data connection, such that, e.g., the plurality of music or audio files described above may be stored in first memory 124 of acoustic module 104 before, during, or after engaging acoustic module 104 with head-worn peripheral device 102.

In some examples, as illustrated in FIG. 7B, head-worn peripheral device 102 can include similar circuitry, e.g., second circuitry 138. Second circuitry 138 includes a second processor 140 and a second memory 142 arranged to execute and store, respectively, a second plurality of non-transitory computer-readable instructions 144 to perform the various functions of second circuitry 138 and head-worn peripheral device 102 as discussed herein. Second circuitry 138 can also include a second communications module 146 configured to send and/or receive data. Second communications module 146 can also include second antenna 148 configured to send and/or receive wireless data over a wireless protocol, where the wireless protocol is selected from at least one of:

a Bluetooth protocol, a Bluetooth Low-Energy (BLE) protocol, a ZigBee protocol, a Wi-Fi (IEEE 802.11) protocol, iPod Accessory Protocol (iAP), Radio Frequency Communication (RFCOMM), Near-field Magnetic Induction (NFMI), Near-Field Electromagnetic Induction (NFEMI) or any other wireless protocol for establishing a wireless communication connection between head-worn peripheral device 102 and another wireless device, e.g., a personal computer (PC), smartphone, tablet, or smart watch. In some examples, as will be described below, second communications module 146 may utilize second antenna 146 to establish a wireless data communication connection with acoustic module 104.

Second communications module 146 can also be configured to send and/or receive data via a wired connection. For example, second communications module 146 may include a data port configured to receive data via a cable or other physical data connection, such that, e.g., the plurality of music or audio files described above may be stored in second memory 142 of head-worn peripheral device 102 before, during, or after engaging with acoustic module 104.

Modular audio system 100 also includes at least one sensor 150. The at least one sensor 150 can be selected from: a button, a touch-capacitive sensor or surface, a gyroscope, an accelerometer, a magnetometer, a microphone, an ultraviolet (UV) light sensor, an infrared (IR) sensor, a daylight sensor, or a camera. It should be appreciated that one or more of these types of sensors can be combined in any conceivable way, e.g., a gyroscope, an accelerometer, and a magnetometer may be provided as a single inertial measurement unit (IMU). As will be discussed below in detail, and as illustrated in FIGS. 7A-7B, sensor 150 can be located on, in, or in communication with either head-worn peripheral device 102 or acoustic module 104. As illustrated in FIGS. 7A-7B dotted lines illustrate an optional component, e.g., sensor 150 can be electrically connected to either first circuitry 120 or second circuitry 138. It should be appreciated that sensor 150 can be configured to receive a user input, e.g., a mechanical input, a gesture, a voice command, etc., and provide that user input to first circuitry 120 or second circuitry 138. Additionally, modular audio system 100 includes at least one battery 152. Similar to sensor 150 discussed above, battery 152 can optionally be connected to first circuitry 120 and/or second circuitry 138. It should be appreciated that battery 152 can be a lithium-ion battery, a capacitor, super-capacitor, or other power supply, and can be located on, in, or in communication with either head-worn-peripheral device 102 or acoustic module 104. In other words, battery 152 is configured to provide a power signal, i.e., power signal 154 to head-worn peripheral device 102 or acoustic module 104 during operation.

In some examples, as illustrated in FIGS. 2 and 8, head-worn peripheral device 102 has an eyeglass form factor which includes a plurality of temples 156A-156B (collectively referred to as "temples 156"). Each temple 156 includes an inside face 158, an outside face 160, a top surface 162, and a bottom surface 164. Additionally, each temple of temples 156 may also include a hinge which pivotably secures each temple to the front of the frame, i.e., the portion of the frames which include the lenses and nose bridge. As will be discussed below in detail, in some examples, the inside face 158 of each temple 156 can include a socket 166 configured to removably engage with acoustic module 104. In some examples, socket 166 is a depression within or beneath the planar surface of inside face 158. In some examples, at least a portion of each temple 156 is formed about a substantial portion of acoustic module housing 106 such that when the head-worn peripheral device 102 is positioned on a user's head a space is formed between the side of the user's head and the inside face 158 so that acoustic module 104 can be engaged and not contact or rub against the user's head.

As will be described below in detail, modular audio system 100 includes a plurality of fastening arrangements FA which detail how acoustic module 104 may be removably secured, engaged, or otherwise attached to the temples 156A-156B of head-worn peripheral device 102. Thus, the following example descriptions should be read in view of FIGS. 3-6B and 8.

Figure 5A:
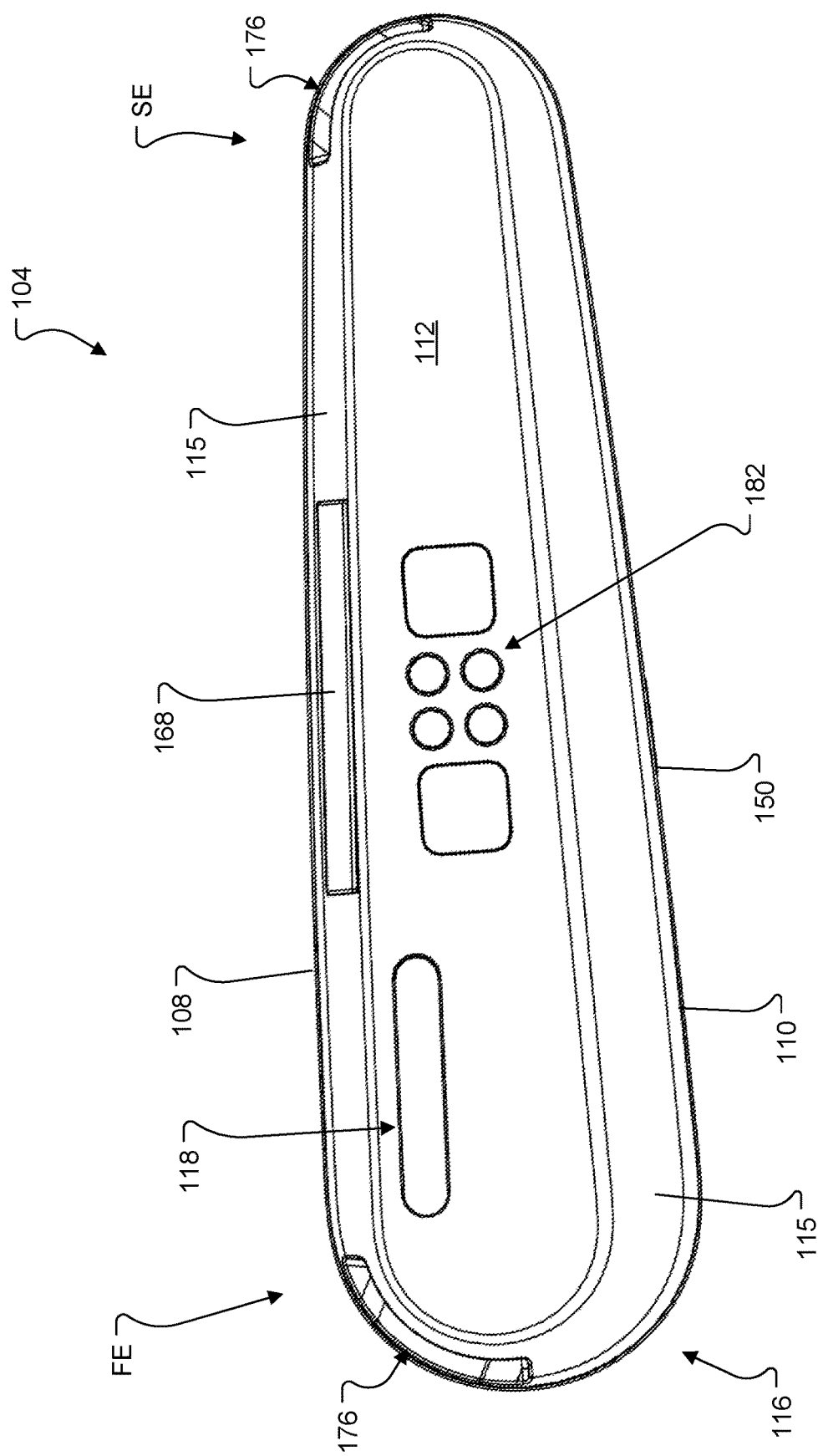
FIG. 5A is right-side elevational view of an acoustic module according to the present disclosure.
Figure 5B:
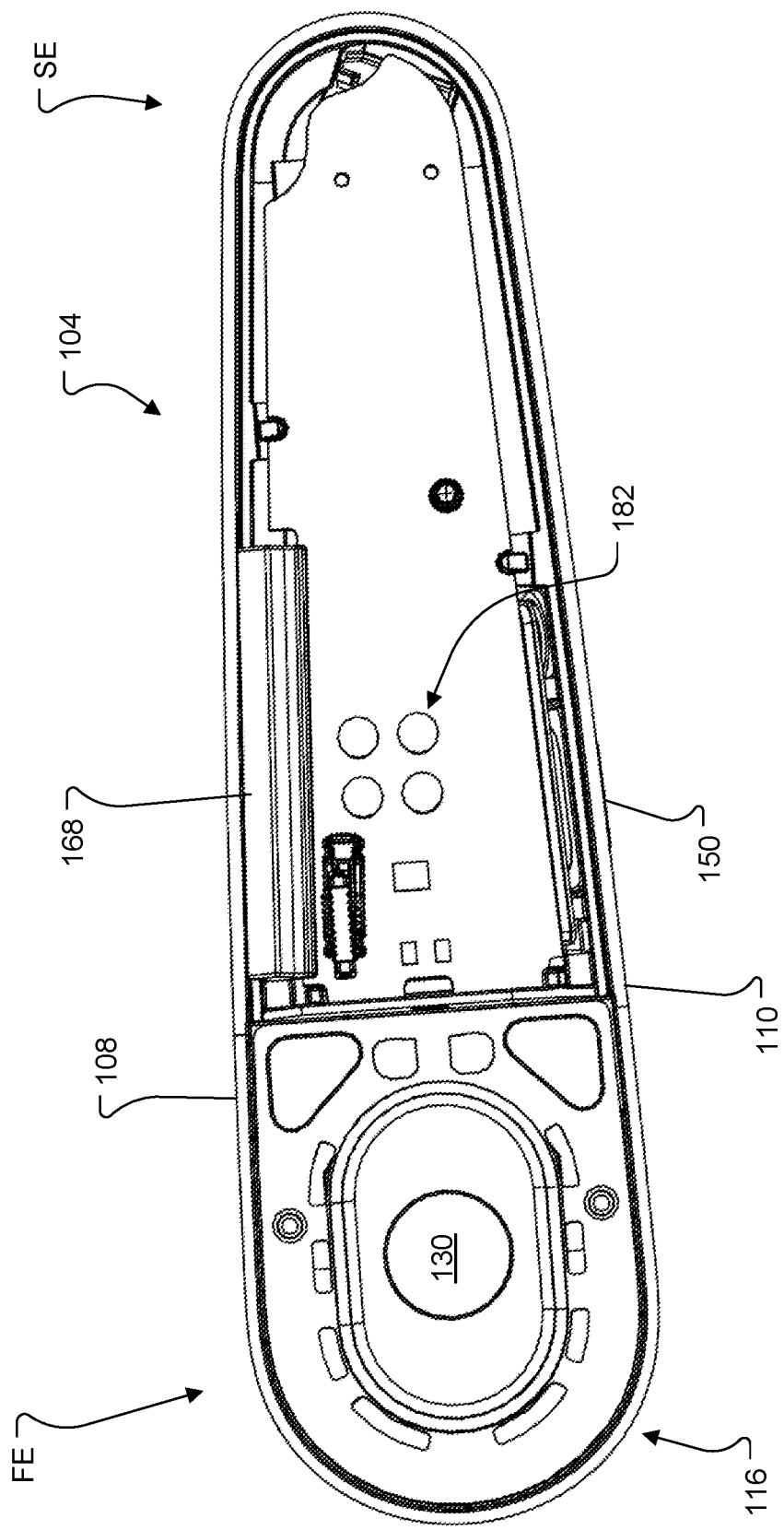
FIG. 5B is right-side elevational view of an acoustic module with the housing partially removed according to the present disclosure.
Figure 6A:
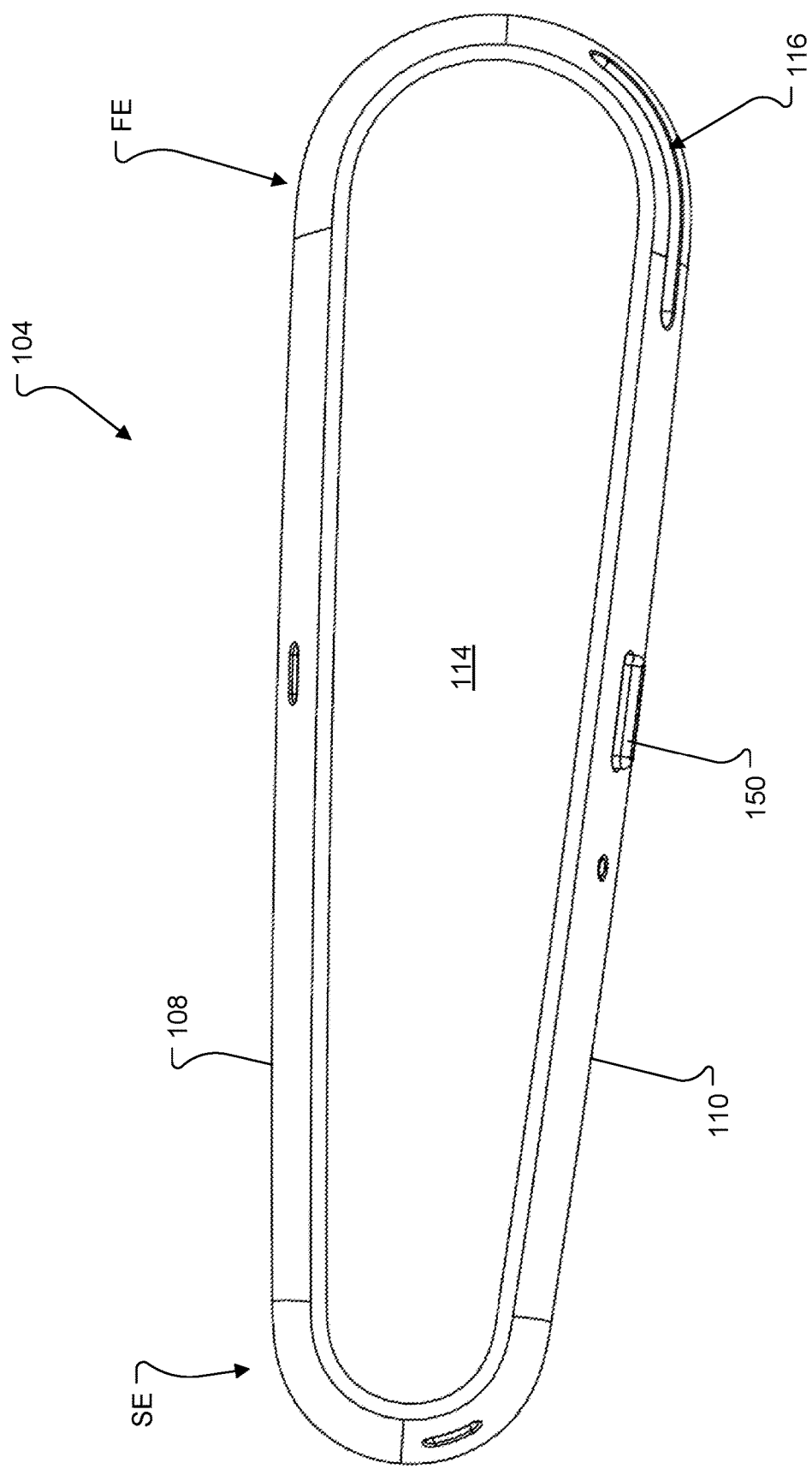
FIG. 6A is left-side elevational view of an acoustic module according to the present disclosure.
Figure 6B:
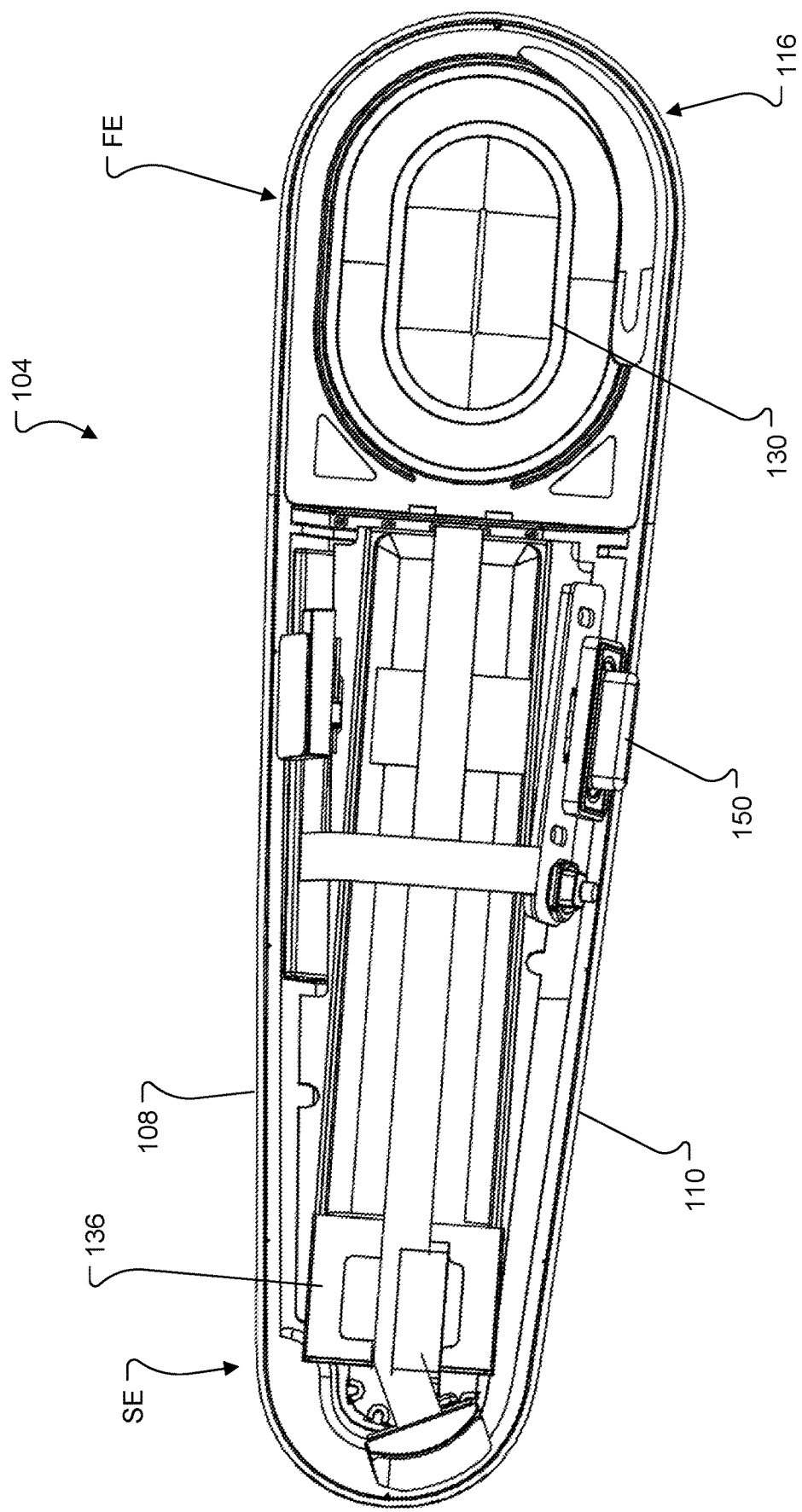
FIG. 6B is left-side elevational view of an acoustic module with the housing partially removed according to the present disclosure.

As illustrated in FIGS. 3, 5A-5B, and 8, one example fastening arrangement FA includes magnetic fastening between acoustic module housing 106 and head-worn peripheral device 102. Accordingly, acoustic module 104 can include a magnet 168, configured to magnetically secure acoustic module housing 106 to one of the temples 156 of head-worn peripheral device 102. As illustrated in FIGS. 3 and 5A-5B, the magnet 168 (i.e., a permanent magnet) is arranged along the tapered surface 115 in a region that extends between the top side 108 and the first side surface 112 of the acoustic module housing 106. The magnet 168 may supported on, embedded in, beneath, or arranged adjacent to the tapered surface. In one example, illustrated in FIG. 8, socket 166 of each of the temples 156 of head-worn peripheral device 102 includes a plate 170 (e.g., a steel plate) capable of magnetically coupling with the magnet 168 of the acoustic module housing 106. The plate 170 may be formed of a material having high magnetic permeability. Alternatively, the inside face 158 of each temple 156 may include complementary magnet configured to engage with the magnet 168 the acoustic module housing 106. The plate 170 is arranged on a tapered surface 172 that is complimentary to the tapered surface 115 of the acoustic module housing 106. The complimentary tapered surface 172 extends between a top edge of the socket 166 and the inside face of the temple 156.

Figure 9:
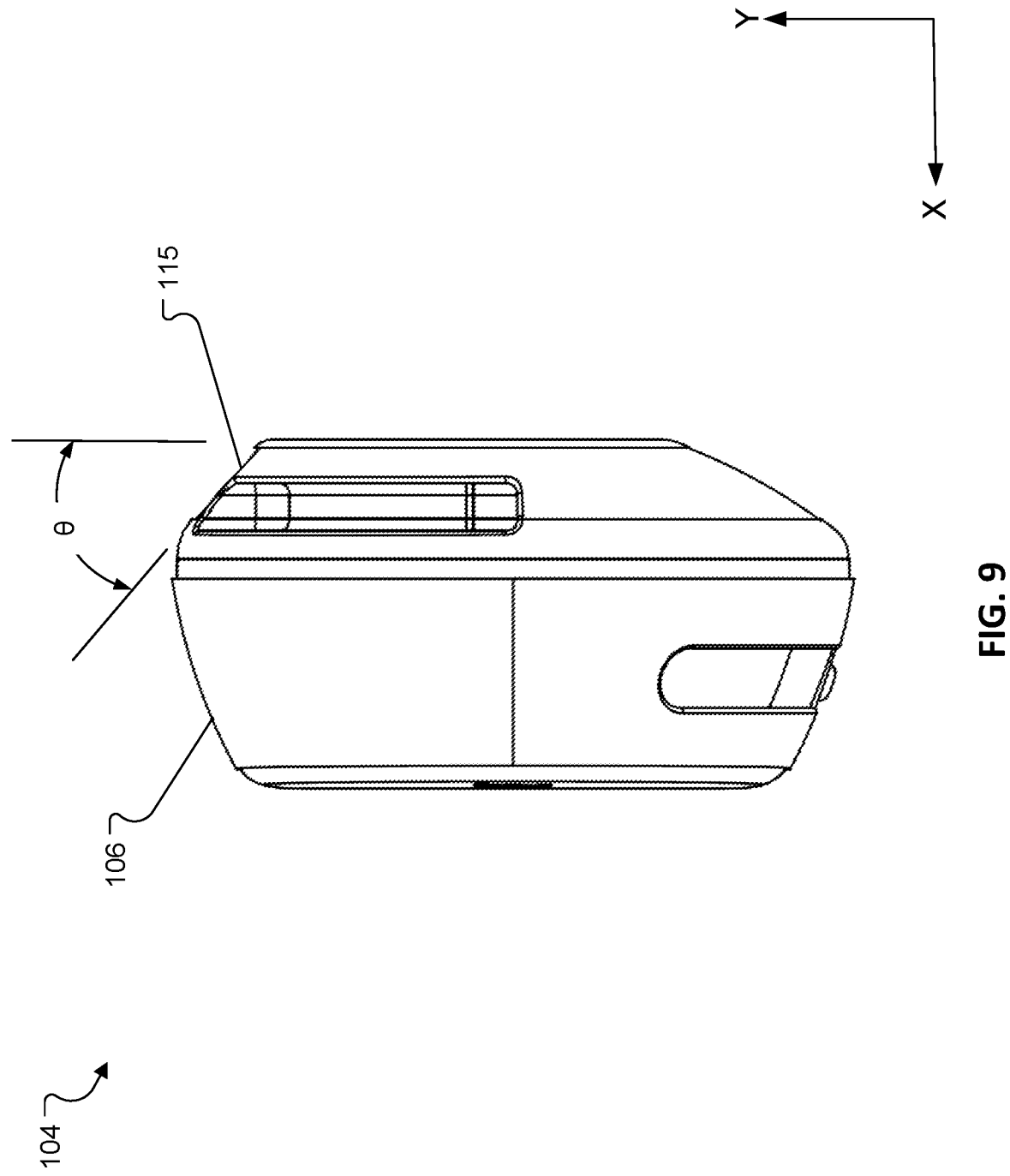
FIG. 9 is an end view of the acoustic module of FIG. 3, viewed from the first end.

By locating the magnet 168 and the plate 170 on complementary angles on the tapered surfaces of the acoustic module housing 106 and the temple 156, the magnet 168 and the plate 170 are arranged such that, in a resting, coupled (i.e., stable) position, respective components of magnetic retention force are provided in at least two axial directions that are orthogonal to each other; i.e., a first component of magnetic retention force is provided in a first (horizontal) axial direction (along the x-axis) and a second component of magnetic retention force is provided in a second (vertical) axial direction (along the y-axis). The tapered surface 115 on the acoustic module housing 106 is arranged at an angle θ (FIG. 9) of about 30 degrees to about 60 degrees, e.g., about 45 degrees to about 50 degrees, e.g., 47.5 degrees, relative to the vertical ("Y") axis. The tapered surface 172 of the socket 166 is arranged at an angle of about 30 degrees to about 60 degrees, e.g., about 45 degrees to about 50 degrees, e.g., 47.5 degrees, relative to the vertical axis. The magnetic coupling provides a magnetic retention force of 9 Newtons to 14 Newtons, e.g., 12 Newtons with a vertical component of magnetic force of 4.5 Newtons to 12.1 Newtons, e.g., 8.1 Newtons.

A pair of hook-shaped protrusions 175 ("ribs") extend downward from the tapered surface 172 of the socket 166 and are arranged to engage recesses 176 (hook-shaped recesses, FIG. 3) formed in the acoustic module housing 106. The recesses 176 are arranged on the tapered surface 115 in regions between the first side surface 112 and upper portions of the first end FE and the second end SE, respectively, of the acoustic module housing 106.

As mentioned above, the arrangement of the magnet 168 on a tapered surface 115, along with the arrangement of the complementary element—the plate 170—in the socket 166, provides a component of magnetic retention force in the vertical (as well horizontal) direction, which helps to retain the module in a coupled position with the temple 156, e.g., due to an impact force, such as when dropped. In addition, the interaction between the recesses 176 and the protrusions 175 inhibits rotation and lateral movement of the acoustic module 104 relative to the temple 156. As a result, the module 104 is much less prone to being decoupled from the temple 156 due to incidental contact, e.g., when the user adjusts the eyeglasses.

The acoustic module 104 is now bounded along two orthogonal surfaces (i.e., the top side 108 and first (outer) side surface 112 of the acoustic module) by the socket 166 formed in the temple, which limits movement in the upward vertical direction and the outward horizontal (lateral) direction. The interaction between the magnet 168 and the plate 170 inhibit movement in the downward vertical direction and the inward horizontal direction. And, the interaction between the protrusions 175 and recesses 176 further inhibit movement of the acoustic module 104 relative to the temple 156 in the inward horizontal direction including inward rotation, such as when an inward horizontal force is applied along the lower edge of the acoustic module 104. This scheme with the combination of magnetic and hook features makes for a nice user interface where the modules 104 are drawn into their proper position with the magnet and hook/rib geometry.

FIG. 8 illustrates a magnetic fastening arrangement FA as described above. In addition to a magnetic fastening arrangement, FIG. 8 also illustrates that socket 166 on inside face 158 of temple 156A can include a multi-pin connection interface 174. Multi-pin connection interface 174 may include a first pin and a second pin configured to electrically connect first circuitry 120 of acoustic module 104 and second circuitry 138 of head-worn peripheral device 102 (e.g., via a mating multi-pin connection interface 182, FIG. 3, on the acoustic module). Across multi-pin connection interface 174, modular audio system 100 can provide a power connection 176 and/or a data connection 178 (shown in FIGS. 7A-7B) between acoustic module 104 and head-worn peripheral device 102. In some examples, battery 152 may be provided within head-worn peripheral device 102 connected to second circuitry 138. Thus, multi-pin connection interface 174 may provide an electrical connection between battery 152 and provide electrical power, e.g., first power signal 154 (discussed above) to first circuitry 120 of acoustic module 104. Conversely, should battery 152 be provided within acoustic module 104 connected to first circuitry 120, multi-pin connection interface 174 may provide electrical power, e.g., first power signal 154 (discussed above) from battery 152 to second circuitry 138 of head-worn peripheral device 102. In other example embodiments, as will be described below, a battery 152 may be provided in both head-worn peripheral device 102 and acoustic module 104 and therefore, power generation and consumption may be distributed between both devices Similarly, in examples which require data to be communicated between, e.g., first communications module 134 of first circuitry 120 and second communications module 146 of second circuitry 138, multi-pin connection interface 174 may provide a path for data to be transferred between the communication modules. As described above, it should be appreciated that the data could also be sent between each communication module wirelessly, e.g., via first antenna 136 and second antenna 148. It should be appreciated that the various functions described above may be distributed in any conceivable combination between first circuitry 120 of acoustic module 104 and second circuitry 138 of head-worn peripheral device 102. For example, power distribution may be distributed between discrete batteries located on or in both devices, sensing, via sensor 150 may be distributed between a sensor located on or in each device, and data processing and wired or wireless communications may be distributed between first circuitry 120 and second circuitry 138.

Alternatively, in some implementations, there may be no electrical communication between the acoustic module(s) and the head-worn peripheral device 102. For example, in some cases, the head-worn peripheral device 102 may not include any electronic componentry or circuitry and may not include a multi-pin connection interface 174.

When the acoustic module 104 is coupled to the temple 156, the second port 118 aligns with a third port 177 in the temple 157 so that that acoustic energy is radiated from the acoustic module housing 106 and through the temple 156. The third port 177 extends from the socket 166 and through to an opposing outer surface 179 of the temple 156. In such cases, the temple 156 may simply support the acoustic module 104, e.g., via the magnetic coupling.

Figure 10:
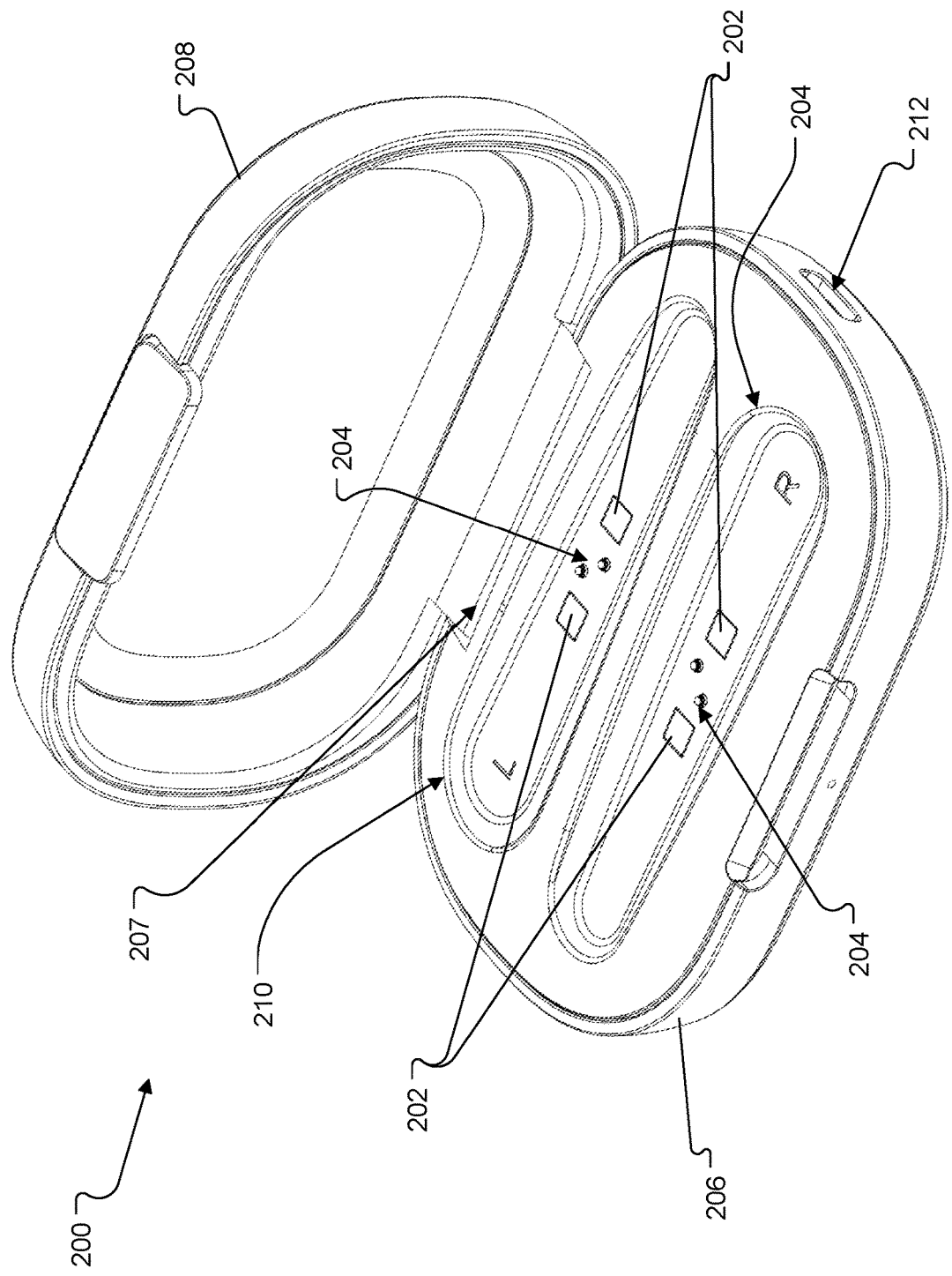
FIG. 10 is a charging case for the acoustic module of FIG. 3.

With reference to FIGS. 3 and 10, in some implementations, the acoustic module 104 may include one or more secondary magnetic elements 180 (two shown in FIG. 3) for coupling the acoustic module 104 to a charging case 200 (FIG. 10). The secondary magnetic elements 180 may comprise permanent magnets or a material having high magnetic permeability. The secondary magnetic elements 180 may be arranged along the outer side surface 112 of the acoustic module housing 106. The secondary magnetic elements 180 may be arranged to magnetically couple to complimentary magnetic elements 202 in the charging case 200. In some cases, the magnetic elements 180 may be arranged to couple with the complimentary magnetic elements 202 in the charging case 200 so as to align the multi-pin connection interface 182 (FIG. 3) on the acoustic module 104 with a mating connection interface 204 in the charging case 200, e.g., for delivering power from the charging case 200 to the acoustic module 104 to recharge a battery 152 (FIG. 7B) of the acoustic module 104, and/or for receiving data from the charging case 200, e.g., for updating firmware on the acoustic module 104.

The charging case 200 may be used for stowing the acoustic modules 104 when not in use and/or for charging the acoustic modules 104. The charging case 200 may include a base 206 and a lid 208 rotatably coupled to the base 206 at a hinge 207. The base 206 may define one or more receptacles 210 (recesses/pockets formed in the base 206) for receiving one or more of the acoustic modules 104. The mating connection interface 204 may be arranged in the receptacle 210 along with the complimentary magnetic elements 202. The base 206 may house circuitry, e.g., charging circuitry for delivering electrical energy to the acoustic module 104. In some cases, the base 206 may also house a battery for portably charging the acoustic module 104. The charging case 200 may include a connector 212 (e.g., a USB-C type connector) for receiving electrical energy from mains power, e.g., for powering the charging circuitry and/or the battery housed in the base 206.

Alternatively, or additionally, the secondary magnetic elements 180 of the acoustic module 104 may be used to aid in coupling the acoustic module 104 to the socket 166 in the temple 156. For example, the temple 156 may include complimentary magnetic elements (e.g., in the socket 166) for coupling with the second magnetic elements 180. For example, for implementations in which an electrical connection is established between the acoustic module 104 and the temple 156, the secondary magnetic elements 180 and complimentary magnetic elements may help to ensure alignment of electrical contact pins and/or may help to ensure that good electrical contact is established.

All definitions, as defined and used herein, should be understood to control over dictionary definitions, definitions in documents incorporated by reference, and/or ordinary meanings of the defined terms.

As used herein the terms "vertical" and "horizontal" should be understood to mean the directions relative to ground when the eyeglasses are worn by a user with the eyeglass lenses in front of the user's eyes and with the user standing in the standard anatomical position. The standard anatomical position is agreed upon by the international medical community. In this position, a person is standing upright with the lower limbs together or slightly apart, feet flat on the floor and facing forward, upper limbs at the sides with the palms facing forward and thumbs pointing away from the body, and head and eyes directed straight ahead.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

The above-described examples of the described subject matter can be implemented in any of numerous ways. For example, some aspects may be implemented using hardware, software or a combination thereof. When any aspect is implemented at least in part in software, the software code can be executed on any suitable processor or collection of processors, whether provided in a single device or computer or distributed among multiple devices/computers.

The present disclosure may be implemented as a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some examples, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to examples of the disclosure. It will be understood that each block of the flowchart illustrations and/or block diagrams, and combinations of blocks in the flowchart illustrations and/or block diagrams, can be implemented by computer readable program instructions.

The computer readable program instructions may be provided to a processor of a, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various examples of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Other implementations are within the scope of the following claims and other claims to which the applicant may be entitled.

While an implementation has been described in which a permanent magnet is provided on an acoustic module and a plate formed of high magnetic permeability material (e.g., a steel plate) is provided on a head-worn peripheral device for magnetically coupling the acoustic module to the head-worn peripheral device, in some cases, the plate formed of high magnetic permeability material may be provided on the acoustic module and the permanent magnet may be provided on the head-worn peripheral device for magnetically coupling the acoustic module to the head-worn peripheral device.

Alternatively, or additionally, the plate of high magnetic permeability material may be replaced with a complimentary magnet so that both the acoustic module and the head-worn peripheral device include corresponding magnets that are attracted to each other for coupling the acoustic module to the head-worn peripheral device.

Although an implementation has been described in which the acoustic module includes a plurality of recesses (e.g., hook-shaped recesses) which engage a plurality of projections (e.g., hook-shaped projections, a/k/a/ "ribs") on the head-worn peripheral device, in other implementations the plurality of projections may be provided on the acoustic module and the plurality of recesses may be provided on the head-worn peripheral device for engaging with the projections on the acoustic module. Alternatively, or additionally, the acoustic device and the head-worn peripheral device may both include at least one recess and at least one projection and the at least one projection on the acoustic module engages the at least one recess on the head-worn peripheral device and the at least one recess on the acoustic module engages the at least one projection on the head-worn peripheral device.

Although an implementation has been described in which the acoustic module has a magnet disposed along the tapered surface, some implementations may include a plurality of magnets disposed along the tapered surface (e.g., a linear array of magnets). In some cases, the acoustic module may include a plurality of magnets arranged in a Halbach array along the tapered surface.

While an implementation has been described in which a magnet is arranged along the tapered surface of the acoustic module housing, in some implementations the acoustic module housing, or a portion thereof (e.g., the tapered surface) may be formed of a magnetic material.

While various examples have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the examples described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize or be able to ascertain using no more than routine experimentation, many equivalents to the specific examples described herein. It is, therefore, to be understood that the foregoing examples are presented by way of example only and that, within the scope of the appended claims and equivalents thereto, examples may be practiced otherwise than as specifically described and claimed. Examples of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A removable acoustic module comprising: an acoustic module housing configured to removably engage with a head-worn peripheral device such that, when engaged with the head-worn peripheral device, the removable acoustic module is arranged to provide acoustic energy proximate a user's ear; and,
   first circuitry arranged within the acoustic module housing, the first circuitry comprising acoustic circuitry and an acoustic transducer, the acoustic circuitry arranged to produce a first electrical signal, the first electrical signal utilized by the acoustic transducer to produce the acoustic energy proximate the user's ear,
   wherein the acoustic module housing is arranged to magnetically couple to the head-worn peripheral device such that a component of magnetic retention force is provided in a vertical axial direction relative to ground,
   wherein the acoustic module housing comprises a pair of hook-shaped recesses that are configured to engage a corresponding pair of hook-shaped protrusions on the head-worn peripheral device,
   wherein the acoustic module housing includes a top side, a bottom side, a first side surface, a second side surface, a first end, a second end, and a first tapered surface that extends at least partially around a periphery of the first side surface such that the first tapered surface is disposed between the first side surface and each of the top side, the first end, and the second end, and
   wherein the recesses are arranged on the first tapered surface in regions between the first side surface and upper portions of the first end and the second end, respectively, of the acoustic module housing.

2. The removeable acoustic module of claim 1, wherein the acoustic module housing is arranged to magnetically couple to the head-worn peripheral device such that, in a resting, coupled position, respective components of magnetic retention force are provided in at least two axial directions that are orthogonal to each other.

3. The removeable acoustic module of claim 1, wherein the magnetic element comprises a permanent magnet or a material with high magnetic permeability for magnetically coupling to the head-worn peripheral device.

4. The removeable acoustic module of claim 1, further comprising a magnetic element arranged on, in, or beneath the first tapered surface to magnetically couple to the head-worn peripheral device.

5. The removeable acoustic module of claim 4, wherein the magnetic element comprises a permanent magnet or a material with high magnetic permeability for magnetically coupling to the head-worn peripheral device.

6. A modular audio system comprising:
   the removeable acoustic module of claim 1; and
   a head-worn peripheral device comprising a wearable eyeglass form-factor, the wearable eyeglass form-factor comprising a temple, the temple includes a socket arranged to receive and removably engage with the removable acoustic module.

7. The modular audio system of claim 6, wherein the first tapered surface supports a first magnetic element and wherein the socket defines a second tapered surface that supports a second magnetic element configured to magnetically couple with the first magnetic element.

8. The modular audio system of claim 7, wherein at least one of the first magnetic element and the second magnetic element comprises a permanent magnet.

9. The modular audio system of claim 8, wherein at least one of the first magnetic element and the second magnetic element comprises a plate formed of a material with high magnetic permeability.

10. A removable acoustic module comprising: an acoustic module housing configured to removably engage with a head-worn peripheral device such that, when engaged with the head-worn peripheral device, the removable acoustic module is arranged to provide acoustic energy proximate a user's ear; and,
    first circuitry arranged within the acoustic module housing, the first circuitry comprising acoustic circuitry and an acoustic transducer, the acoustic circuitry arranged to produce a first electrical signal, the first electrical signal utilized by the acoustic transducer to produce the acoustic energy proximate the user's ear,
    wherein the acoustic module housing is arranged to magnetically couple to the head-worn peripheral device such that, in a resting, coupled position, respective components of magnetic retention force are provided in at least two axial directions that are orthogonal to each other,
    wherein the acoustic module housing comprises a pair of hook-shaped recesses that are configured to engage a corresponding pair of hook-shaped protrusions on the head-worn peripheral device,
    wherein the acoustic module housing includes a top side, a bottom side, a first side surface, a second side surface, a first end, a second end, and a first tapered surface that extends at least partially around a periphery of the first side surface such that the first tapered surface is disposed between the first side surface and each of the top side, the first end, and the second end, and
    wherein the recesses are arranged on the first tapered surface in regions between the first side surface and upper portions of the first end and the second end, respectively, of the acoustic module housing.

11. The removable acoustic module of claim 10, wherein a first component of magnetic retention force is provided in a first, horizontal axial direction and a second component of magnetic retention force is provided in a second, vertical axial direction.

12. The removeable acoustic module of claim 10, further comprising a magnetic element arranged on, in, or beneath the first tapered surface to magnetically couple to the head-worn peripheral device.

13. The removeable acoustic module of claim 12, wherein the magnetic element comprises a permanent magnet or a material with high magnetic permeability for magnetically coupling to the head-worn peripheral device.

14. A modular audio system comprising:
the removeable acoustic module of claim 10; and
a head-worn peripheral device comprising a wearable eyeglass form-factor, the wearable eyeglass form-factor comprising a temple, the temple includes a socket arranged to receive and removably engage with the removable acoustic module.

15. The modular audio system of claim 14, wherein the first tapered surface supports a first magnetic element and wherein the socket defines a second tapered surface that supports a second magnetic element configured to magnetically couple with the first magnetic element.

16. The modular audio system of claim 15, wherein at least one of the first magnetic element and the second magnetic element comprises a permanent magnet.

17. The modular audio system of claim 16, wherein at least one of the first magnetic element and the second magnetic element comprises a plate formed of a material with high magnetic permeability.

\* \* \* \* \*